(12) United States Patent
Miyasaka et al.

(10) Patent No.: US 11,579,043 B2
(45) Date of Patent: Feb. 14, 2023

(54) INFORMATION TERMINAL AND MACHINE COMPONENT DIAGNOSIS SYSTEM

(71) Applicant: NSK LTD., Tokyo (JP)

(72) Inventors: Takanori Miyasaka, Fujisawa (JP); Yoshihiro Sato, Fujisawa (JP); Yasushi Muto, Fujisawa (JP); Yingyi Wen, Fujisawa (JP); Osamu Yoshimatsu, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/716,871

(22) Filed: Dec. 17, 2019

(65) Prior Publication Data
US 2020/0124499 A1 Apr. 23, 2020

Related U.S. Application Data

(63) Continuation of application No. 16/095,271, filed as application No. PCT/JP2018/006829 on Feb. 23, 2018, now abandoned.

(30) Foreign Application Priority Data

Mar. 24, 2017 (JP) ................................. 2017-059297

(51) Int. Cl.
  *G01M 13/045* (2019.01)
(52) U.S. Cl.
  CPC ................................. *G01M 13/045* (2013.01)
(58) Field of Classification Search
  None
  See application file for complete search history.

(56) References Cited

U.S. PATENT DOCUMENTS 5,477,730 A 12/1995 Carter
7,034,711 B2 4/2006 Sakatani
(Continued)

FOREIGN PATENT DOCUMENTS

CN 1401971 A 3/2003
CN 1926413 A 3/2007
(Continued)

OTHER PUBLICATIONS

Written Opinion (PCT/ISA/237) issued by the International Searching Authority in corresponding International Application No. PCT/JP2018/006829, dated May 22, 2018.
(Continued)

*Primary Examiner* — Brent A. Fairbanks
(74) *Attorney, Agent, or Firm* — Sughrue Mion, PLLC (57) ABSTRACT

An information terminal is configured to extract a predetermined frequency band from a waveform of a signal of a machine component detected by a vibration sensor, to compare an analyzed frequency component and a damaging frequency resulting from a damage of the machine component, and to diagnose abnormality of the machine component. The information terminal includes a database in which the damaging frequency resulting from the damage of the machine component is preserved as a converted damaging frequency obtained by converting the damaging frequency on a basis of a predetermined rotating speed of the machine component. The damaging frequency is provided by calculating the converted damaging frequency in the database by using an actual rotating speed of the machine component. Accordingly, it is possible to keep specifications of a machine component confidential without preserving the specifications of the machine component.

9 Claims, 7 Drawing Sheets

(56) References Cited

U.S. PATENT DOCUMENTS

| | | | |
|---|---|---|---|
| 7,930,111 B2* | 4/2011 | Luo | F16C 19/527 702/33 |
| 10,203,242 B2 | 2/2019 | Hedin | |
| 2003/0030565 A1 | 2/2003 | Sakatani et al. | |
| 2004/0030419 A1* | 2/2004 | Miyasaka | G01H 1/00 700/32 |
| 2006/0145881 A1 | 7/2006 | Sakatani et al. | |
| 2006/0167659 A1 | 7/2006 | Miyasaka et al. | |
| 2007/0118333 A1 | 5/2007 | Miyasaka et al. | |
| 2008/0033695 A1 | 2/2008 | Sahara | |
| 2009/0045940 A1* | 2/2009 | Sadana | G05B 19/4065 340/539.1 |
| 2009/0292505 A1* | 11/2009 | Van Dyke | G01H 1/00 702/184 |
| 2012/0272736 A1 | 11/2012 | Griffaton | |
| 2012/0316796 A1* | 12/2012 | Goodman | G01M 13/028 702/39 |
| 2013/0006540 A1* | 1/2013 | Sakaguchi | F03D 17/00 702/34 |
| 2013/0116936 A1* | 5/2013 | Yamamoto | G01N 29/14 702/34 |
| 2014/0121996 A1 | 5/2014 | Piety et al. | |
| 2014/0122085 A1 | 5/2014 | Piety et al. | |
| 2014/0142872 A1 | 5/2014 | Hedin | |
| 2014/0214363 A1* | 7/2014 | Hatch | G05B 19/4065 702/181 |
| 2014/0257714 A1* | 9/2014 | Kiviniemi | G01M 13/021 702/33 |
| 2016/0041068 A1* | 2/2016 | Wascat | G01D 21/00 702/39 |
| 2016/0187226 A1 | 6/2016 | Tsutsui et al. | |
| 2016/0282224 A1 | 9/2016 | Takada et al. | |
| 2017/0052062 A1 | 2/2017 | Jia et al. | |
| 2017/0108407 A1 | 4/2017 | Takada et al. | |
| 2017/0181098 A1 | 6/2017 | Shinohara | |
| 2018/0217025 A1* | 8/2018 | Haseba | F03D 17/00 |
| 2019/0271584 A1 | 9/2019 | Hedin | |

FOREIGN PATENT DOCUMENTS

| | | |
|---|---|---|
| CN | 102589881 A | 7/2012 |
| CN | 102597735 A | 7/2012 |
| CN | 102798529 A | 11/2012 |
| CN | 103688144 A | 3/2014 |
| CN | 103884506 A | 6/2014 |
| EP | 2 166 331 A2 | 3/2010 |
| JP | 2004-212225 A | 7/2004 |
| JP | 2004-279322 A | 10/2004 |
| JP | 2005-233789 A | 9/2005 |
| JP | 2015-114214 A | 6/2015 |
| JP | 2016-24997 A | 2/2016 |
| JP | 2017-049155 A | 3/2017 |
| WO | WO 2018/094273 * 11/2017 ............... G01H 1/00 |  |

OTHER PUBLICATIONS

Written Opinion (PCT/ISA/237) issued by the International Searching Authority in corresponding International Application No. PCT/JP2018/006827, dated May 22, 2018.
Office Action dated Aug. 19, 2019 by the United States Patent and Trademark Office in counterpart U.S. Appl. No. 16/095,272.
International Search Report (PCT/ISA/210), issued by International Searching Authority in corresponding International Application No. PCT/JP2018/006827, dated May 22, 2018.
International Search Report (PCT/ISA/210), issued by International Searching Authority in corresponding International Application No. PCT/JP2018/006829, dated May 22, 2018.
Communication dated Feb. 19, 2020, from the European Patent Office in counterpart European Application No. 18772138.6.
Communication dated Feb. 19, 2020, from the European Patent Office in counterpart European Application No. 18770281.6.
Office Action dated Mar. 2, 2021 by the State Intellectual Property Office of P.R. China in counterpart Chinese Patent Application No. 201880020306.X.
Office Action dated Mar. 25, 2021 by the State Intellectual Property Office of P.R. China in counterpart Chinese Patent Application No. 201880019178.7.
Communication dated Feb. 14, 2022 issued by the United States Intellectual Property Office in counterpart U.S. Appl. No. 16/800,667.
Communication dated Jan. 6, 2022 issued by the State Intellectual Property Office of P R. China in English counterpart Chinese application No. 201880020306.X.
"Electromechanical Equipment Status Monitoring and Troubleshooting Techniques", Poantum, Northwest Industrial University Press, Mar. 1995, pp. 305-306.
Office Action dated Dec. 17, 2021 in Chinese application No. 201880019178.7.
Office Action dated Oct. 26, 2021 issued in U.S. Appl. No. 16/800,667.
Office Action dated Nov. 10, 2022 by the United States Patent Office for U.S. Appl. No. 16/800,667.

* cited by examiner

| PARTS OF BEARING | FREQUENCY CORRESPONDING TO PART |
|---|---|
| INNER RING (Si) | $Si = \dfrac{fr}{2}\left(1 + \dfrac{Da}{dm} \cdot \cos\alpha\right) Z$ |
| OUTER RING (So) | $So = \dfrac{fr}{2}\left(1 - \dfrac{Da}{dm} \cdot \cos\alpha\right) Z$ |
| ROLLING ELEMENT (Sb) | $2fb = fr\left(1 - \dfrac{Da^2}{dm^2} \cdot \cos^2\alpha\right)\dfrac{dm}{Da}$ |
| CAGE (Sc) | $fc = \dfrac{fr}{2}\left(1 - \dfrac{Da \cdot \cos\alpha}{dm}\right)$ | fr : REVOLUTION (Hz) OF INNER RING (OUTER RING)

fc : ROTATING SPEED (Hz) OF CAGE fb : ROTATING SPEED (Hz) OF ROLLING ELEMENT dm : PITCH CIRCLE DIAMETER OF ROLLING ELEMENT (mm)

Z : NUMBER OF ROLLING ELEMENT

Da : DIAMETER OF ROLLING ELEMENT (mm)

$\alpha$ : CONTACT ANGLE (rad)

INFORMATION TERMINAL AND MACHINE COMPONENT DIAGNOSIS SYSTEM

CROSS-REFERENCE TO RELATED PATENT APPLICATION

This application is a continuation of U.S. application Ser. No. 16/095,271 filed Oct. 19, 2018, which is a National Stage Entry of PCT/JP2018/006829 having a filing date of Feb. 23, 2018. Foreign priority is claimed from JP 2017-059297 having a filing date of Mar. 24, 2017. The above-noted applications are incorporated herein by reference in their entirety.

TECHNICAL FIELD

The present invention relates to an information terminal and a machine component diagnosis system, and more specifically, to an information terminal configured to diagnose abnormality of a machine component and a machine component diagnosis system configured to diagnose abnormality of the machine component by using the information terminal and a vibration analyze.

RELATED ART

In the related art, a machine component diagnosis system including an information terminal and a server connected via a communication network and configured to diagnose abnormality of a machine component has been known (for example, refer to Patent Document 1). The information terminal of the machine component diagnosis system disclosed in Patent Document 1 includes a measured data transmission means for receiving measured acceleration data and temperature data and transmitting the same to the server, and a diagnosis result display means for displaying a diagnosis result returned from the server. Also, the server includes a diagnosis target specification storing means which is a database of the specification of a diagnosis target, a diagnosis means for diagnosing abnormality of the machine component from the acceleration data and temperature data while referring to the specification of the diagnosis target, and a diagnosis result transmission means for returning the diagnosis result to the information terminal.

CITATION LIST

Patent Documents

Patent Document 1: JP-A-2016-024007

SUMMARY OF THE INVENTION

Problems to be Solved by the Invention

However, according to Patent Document 1, since the specification of the machine component is stored in the diagnosis target specification storing means of the server, the further improvements are needed when a manufacturer of the machine component intends to keep the specification of the machine component confidential. Also, since the acceleration data and temperature data measured with the information terminal are transmitted to the server, as they are, and the server processes the data to diagnose the abnormality of the machine component, a data amount to be transmitted from the information terminal to the server becomes enormous. For this reason, it takes much time to transfer the data and the power consumption of the information terminal increases, so that there is a room for improvement.

The present invention has been made in view of the above situations, and an object thereof is to provide an information terminal and a machine component diagnosis system capable of keeping specifications of a machine component confidential without preserving the specifications of the machine component, which are necessary when diagnosing abnormality of the machine component, in the information terminal.

Means for Solving the Problems

The object of the present invention is achieved by following configurations.

(1) An information terminal configured to extract a predetermined frequency band from a waveform of a signal of a machine component detected by a vibration sensor, to compare an analyzed frequency component and a damaging frequency resulting from a damage of the machine component, and to diagnose abnormality of the machine component, the information terminal including:

a database in which the damaging frequency resulting from the damage of the machine component is preserved as a converted damaging frequency obtained by converting the damaging frequency on the basis of a predetermined rotating speed of the machine component, wherein the damaging frequency is provided by calculating the converted damaging frequency in the database by using an actual rotating speed of the machine component.

(2) The information terminal of the above (1), wherein the converted damaging frequency preserved in the database is calculated for each of the machine components of a plurality of bearing numbers, based on specifications of the machine component of the bearing number and a predetermined rotating speed of the machine component, with a predetermined relation equation for providing the damaging frequency, and wherein the damaging frequency is provided by calculating the converted damaging frequency corresponding to the bearing number in the database by using the actual rotating speed of the machine component.

(3) The information terminal of the above (2), further including a display operation unit for inputting or selecting the bearing number of the machine component, wherein when the converted damaging frequency corresponding to the input or selected bearing number is included in the database, the damaging frequency is provided by calculating the converted damaging frequency corresponding to the bearing number in the database by using the actual rotating speed of the machine component, and wherein when the converted damaging frequency corresponding to the input or selected bearing number is not included in the database, the damaging frequency is calculated on the basis of the specifications of the machine component directly input from the display operation unit and the actual rotating speed of the machine component or on the basis of the converted damaging frequency directly input from the display operation unit and the actual rotating speed of the machine component, with the predetermined relation equation for providing the damaging frequency.

(4) The information terminal of one of the above (1) to (3), wherein the machine component is a bearing, wherein in the database, a bearing damaging frequency resulting from damages of an inner ring, an outer ring, a rolling element and a cage of the bearing is preserved as a converted bearing damaging frequency obtained by converting the bearing damaging frequency on the basis of a predetermined rotating speed of the bearing, and wherein the bearing damaging frequency is provided by calculating the converted bearing damaging frequency in the database by using an actual rotating speed of the bearing.

(5) A machine component diagnosis system including the information terminal of one of the above (1) to (4) and a vibration analyzer capable of transmitting and receiving a signal to and from the information terminal, wherein the vibration analyzer includes:

the vibration sensor configured to detect vibration of the machine component;

a filter processing unit configured to extract a predetermined frequency band from a waveform of a signal detected by the vibration sensor, and a calculation processing unit configured to analyze frequency of a waveform after filter processing obtained by the filter processing unit and to obtain spectrum data, and wherein the information terminal includes:

a diagnosis unit configured to compare the frequency component, which is included in the spectrum data transmitted from the vibration analyzer, and the damaging frequency resulting from the damage of the machine component, and to diagnose abnormality of the machine component, and a display unit configured to output a diagnosis result diagnosed by the diagnosis unit.

Effects of the Invention

The information terminal of the present invention includes the database in which the damaging frequency resulting from the damage of the machine component is preserved as the converted damaging frequency obtained by converting the damaging frequency on the basis of the predetermined rotating speed of the machine component, and the damaging frequency is provided by calculating the converted damaging frequency in the database by using the actual rotating speed of the machine component. Thereby, it is not necessary to preserve the specifications of each machine component in the information terminal, so that it is possible to keep the specifications of the machine component confidential.

Also, the machine component diagnosis system of the present invention includes the information terminal and the vibration diagnosis unit capable of transmitting and receiving a signal to and from the information terminal, the vibration diagnosis unit includes the vibration sensor configured to detect the vibration of the machine component, the filter processing unit configured to extract the predetermined frequency band from the waveform of the signal detected by the vibration sensor, and the calculation processing unit configured to analyze frequency of the waveform after filter processing obtained by the filter processing unit and to obtain the spectrum data, and the information terminal includes the diagnosis unit configured to compare the frequency component, which is included in the spectrum data transmitted from the vibration analyzer, and the damaging frequency resulting from the damage of the machine component, and to diagnose abnormality of the machine component, and the display unit configured to output the diagnosis result diagnosed by the diagnosis unit. Accordingly, it is possible to reduce the data amount to be transmitted from the analyzer to the information terminal, thereby diagnosing the machine component at high speed.

DETAILED DESCRIPTION OF EMBODIMENTS

First Embodiment

Hereinafter, a machine component diagnosis system in accordance with a first embodiment of the present invention will be described in detail with reference to FIGS. 1 to 5.

Figure 1:
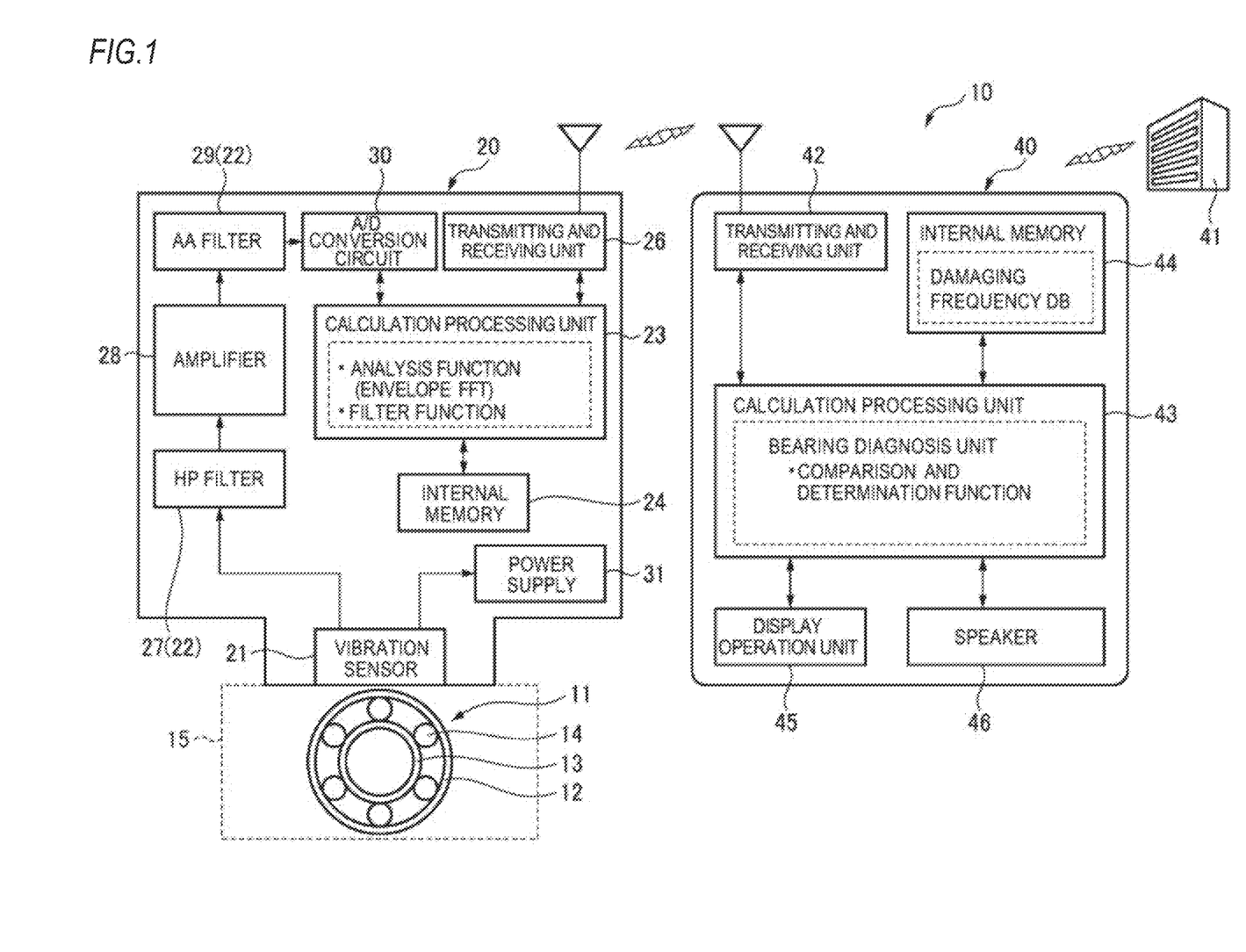
FIG. 1 is a block diagram depicting a configuration of a machine component diagnosis system in accordance with a first embodiment of the present invention.

FIG. 1 is a block diagram depicting a configuration of a machine component diagnosis system in accordance with the first embodiment. As shown in FIG. 1, a machine component diagnosis system 10 includes a wireless type vibration analyzer 20 (hereinafter, referred to as "analyzer 20") and an information terminal 40. The machine component diagnosis system 10 is configured to diagnose a machine component. Meanwhile, in the below, a rolling bearing 11 will be exemplified as the machine component.

The rolling bearing 11 includes an outer ring 12 that is to be internally fitted to a housing 15 or the like, an inner ring 13 that is to be externally fitted to a rotary shaft of a machine equipment (not shown), a plurality of rolling elements 14 rollingly arranged between the outer ring 12 and the inner ring 13, and a cage (not shown) configured to rollingly keep the rolling elements 14.

The wireless type vibration analyzer 20 mainly includes a vibration sensor 21, a high-pass filter (HP filter) 27 and an anti-aliasing filter (AA filter) 29 as a filter processing unit 22, an amplifier 28, an A/D conversion circuit 30, a calculation processing unit 23, an internal memory 24, a transmitting and receiving unit 26, and a power supply 31.

The vibration sensor 21 is configured by a piezoelectric type acceleration sensor and the like, for example, and can detect vibration of the rolling bearing 11 when the analyzer 20 is mounted to the housing 15 and power is fed thereto from the power supply 31.

For example, a leading end portion of the analyzer 20 to which the vibration sensor 21 is mounted is formed with a female screw part (not shown), and a magnet is mounted to a member to be screwed to the female screw part, so that the analyzer 20 may be fixed to the housing 15.

The power supply 31 is configured by a lithium battery or the like, so that it can be charged from an outside through a USB cable or the like. Also, a side of the analyzer 20 is provided with a switch (not shown) for turning on/off the power supply 31.

A vibration signal detected by the vibration sensor 21 passes through the HP filter 27, the amplifier 28, the AA filter 29 and the A/D conversion circuit 30 in corresponding order. For this reason, the HP filter 27 and AA filter 29 configuring the filter processing unit 22 function as a bandpass filter, so that a specific frequency band of the detected vibration signal is extracted, is amplified by the amplifier 28, is converted into a digital signal by the A/D conversion circuit 30 and is then transmitted to the calculation processing unit 23.

The calculation processing unit 23 has a filter processing function, and is configured to perform filter processing for the specific frequency band extracted by the HP filter 27 and the AA filter 29. Therefore, in the first embodiment, the filter processing function of the calculation processing unit 23 functions as a part of the filter processing unit 22 of the present invention. Also, the calculation processing unit 23 is configured to perform absolute value processing or envelope processing and then FFT analysis for the signal after the filter processing, thereby generating spectrum data, as necessary.

The calculated spectrum data and the like are temporarily stored in the internal memory 24.

The transmitting and receiving unit 26 is configured by Bluetooth (registered trademark) and the like, for example, and is configured to receive an operation command signal from the information terminal 40 and to transmit, to the information terminal 40, the spectrum data obtained by the analysis function of the calculation processing unit 23. In the meantime, the communication between the analyzer 20 and the information terminal 40 may be performed in a wired manner.

The information terminal 40 is a portable information terminal such as a tablet, for example, and can be connected to the analyzer 20 via a communication network such as the Internet. Also, the information terminal can be connected to a host computer of a headquarters 41 via the Internet, and can perform update by downloading an application program from the host computer.

The information terminal 40 mainly includes a transmitting and receiving unit 42, a calculation processing unit 43, an internal memory 44, a display operation unit (display unit) 45, and a speaker 46.

The information terminal 40 is configured to perform calculation processing at the calculation processing unit 43 in accordance with a predetermined sequence while referring to a database of damaging frequencies and the like stored in the internal memory 44, based on the spectrum data received from the transmitting and receiving unit 26 of the analyzer 20 by the transmitting and receiving unit 42, and to output a result of the calculation processing to the display operation unit 45.

The transmitting and receiving unit 42 is configured to transmit and receive a variety of data to and from the analyzer 20, such as transmission of the operation command signal, receiving of the spectrum data, and the like.

The display operation unit 45 is configured by a liquid crystal panel, and can switch a screen by control software embedded in the information terminal 40. The display operation unit 45 is configured to display a vibration value, a diagnosis result, and a processing result of diverse waveforms and the like, and can select and input a diagnosis menu of the rolling bearing 11, a bearing number of the rolling bearing 11, a rotating speed of a rotary ring, and the like.

The calculation processing unit 43 is configured to check whether the rolling bearing 11 is abnormal and an abnormal part thereof by referring to the database of the damaging frequencies and the like stored in the internal memory 44, based on the spectrum data received from the transmitting and receiving unit 26 of the analyzer 20.

In the meantime, the damaging frequency, which is a frequency generated by a component such as the rolling bearing 11 that has been damaged, is stored in the internal memory 44 is a converted damaging frequency, which is a predetermined value of each part of the rolling bearing 11, that has been 1 converted on the basis of a predetermined rotating speed of the rolling bearing 11, and the damaging frequency that is to be used for diagnosis is obtained by calculating the converted damaging frequency by using an actual rotating speed of the rolling bearing 11. For example, an inner ring damaging component Si1, an outer ring damaging component So1, a rolling element damaging component Sb1 and a cage component Sc1 upon unit rotation speed, which are calculated in advance from the internal specification of the registered bearing number (sizes necessary for relation equations shown in FIG. 3, the number of the rolling element, and the like), are set as the converted bearing damaging frequencies by using the relation equations, and the converted bearing damaging frequencies are preserved as DLL (Dynamic Link Library).

Figure 3:
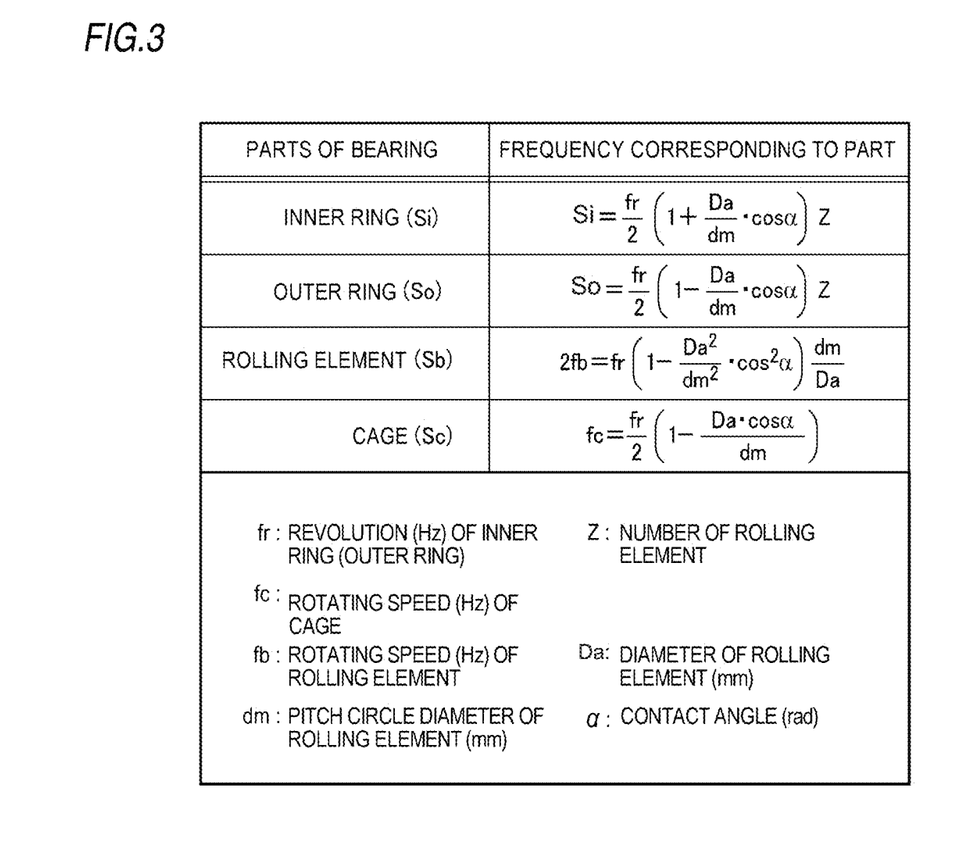
FIG. 3 is a table showing parts of a rolling bearing of the first embodiment and damaging frequencies corresponding to the parts.

The bearing number, such as a part number that may appear in a catalog, of the rolling bearing 11 may be selected from a bearing number list displayed on a display screen of the information terminal 40 or may be manually input, individually. In the meantime, in the case of the rolling bearing 11 of which the bearing number has not been registered, the specification of the rolling bearing 11 and the actual rotating speed of the machine component are directly input, so that the damaging frequency resulting from the damage of each part of the rolling bearing 11 is calculated using the relation equations shown in FIG. 3 by the calculation processing unit 43. In this case, the relation equations shown in FIG. 3 are preserved in the database.

Alternatively, in the case of the rolling bearing 11 of which the bearing number has not been registered, the converted damaging frequency at a predetermined rotating speed calculated at the outside may be directly input from the display operation unit 45, and the calculation processing unit 43 may be configured to calculate the damaging frequency by using the converted damaging frequency, based on the actual rotating speed of the machine component.

In any configuration, the converted damaging frequency of the rolling bearing 11 of which the bearing number has not been registered is preferably preserved in the internal memory 44 together with the bearing number so that it can be called when actually operating the machine component.

Subsequently, a sequence of measurement, diagnosis and the like that are to be performed by the machine component diagnosis system 10 of the first embodiment is described.

First, an operator turns on the switch of the power supply 31 of the analyzer 20 and selects a diagnosis menu from an input screen of the display operation unit 45 of the information terminal 40 (step S1).

For comparing currently received values, such as the spectrum data described below, to predetermined values, the diagnosis menu mainly includes respective functions, having pre-loaded values, of a bearing diagnosis function, a vibration value measuring function, a simple diagnosis function, and a frequency analysis function. The bearing diagnosis function is to diagnose whether the inner and outer rings, the rolling element and the cage of the bearing are damaged and damaged parts thereof. The vibration value measuring function is to measure effective values, peak values and crest factors of displacement, velocity, acceleration and the like of vibration. The simple diagnosis function is to simply diagnose whether the rolling bearing is abnormal by comparing the effective values, peak values and crest factors of the displacement, velocity, acceleration and the like of the detected vibration, with preset thresholds. The frequency analysis function is to display an FFT waveform obtained by analyzing frequency of a vibration waveform by FFT or the like.

<Bearing Diagnosis>

Figure 2:
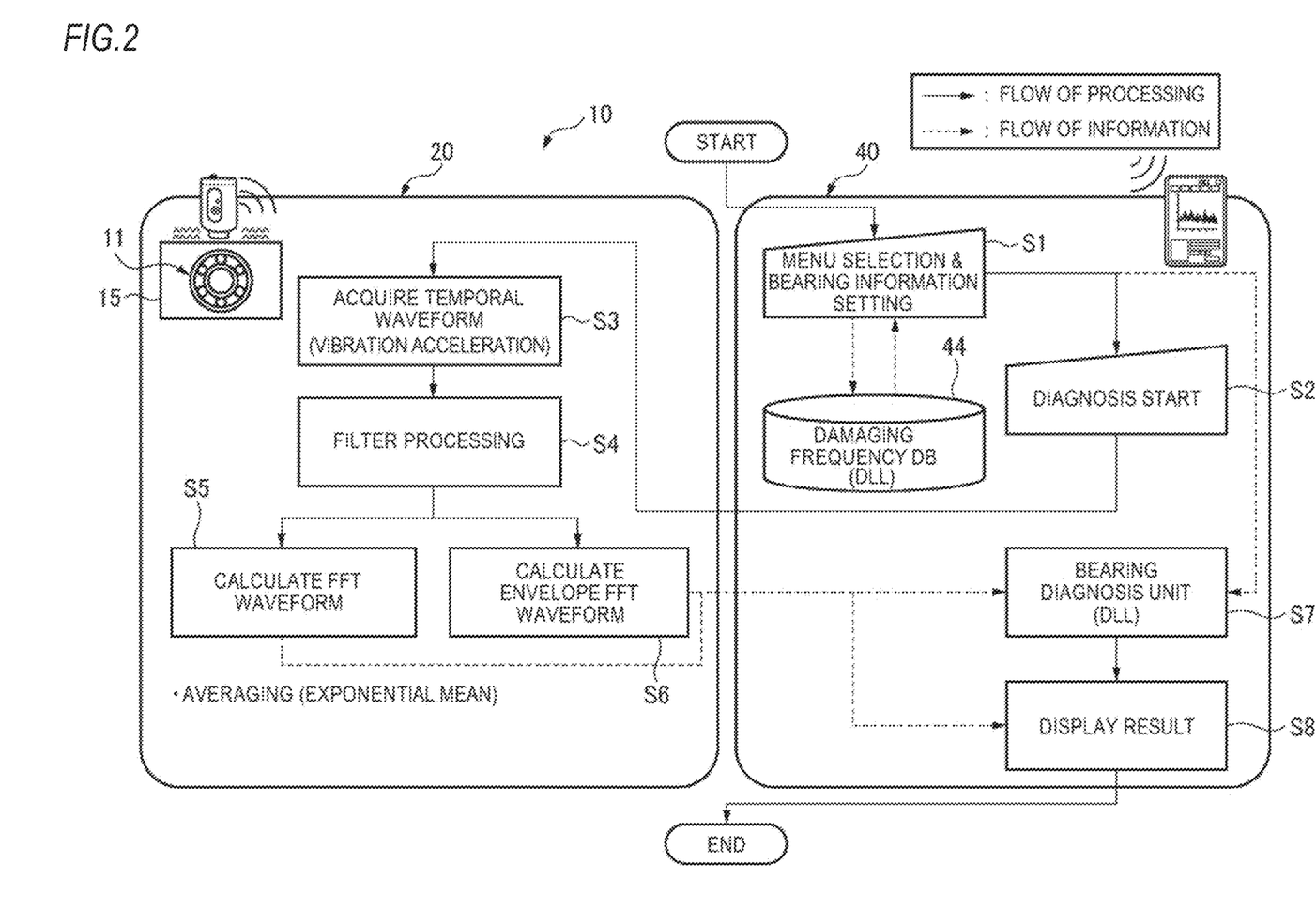
FIG. 2 is a flowchart depicting a sequence of bearing diagnosis that is to be performed by the machine component diagnosis system shown in FIG. 1.

When the bearing diagnosis function of the machine component diagnosis system 10 is selected, a bearing number, a revolution and the like of the bearing to be diagnosed are first manually input and the diverse information such as the converted damaging frequency corresponding to the bearing of the stored bearing number is called and set from the internal memory 44 in step S1, and diagnosis start is instructed (step S2), as shown in FIG. 2.

The analyzer 20 operates on the basis of a command signal transmitted from the transmitting and receiving unit 42 of the information terminal 40, and the vibration sensor 21 acquires a temporal waveform of the vibration of the rolling bearing 11 (step S3).

The acquired vibration signal is filter-processed by the HP filter 27 and the AA filter 29 (step S4), and the specific frequency band thereof is extracted. Thereafter, a predetermined frequency band is further extracted from the specific frequency band by the filter function of the calculation processing unit 23.

Then, the calculation processing unit 23 performs the frequency analysis for the extracted predetermined frequency band to calculate an FFT waveform (step S5) or performs the frequency analysis after performing the absolute value processing or envelope processing, thereby calculating an envelope FFT waveform (step S6). In the meantime, the FFT waveform is subjected to averaging processing by using an exponential mean. The calculation processing unit 23 is an FFT calculation unit configured to calculate a frequency spectrum of the vibration signal, too, so that it calculates a frequency spectrum of the vibration signal on the basis of FFT algorithm and envelope analysis.

The calculated frequency spectrum is transmitted, as spectrum data, from the transmitting and receiving unit 26 of the analyzer 20 to the information terminal 40. Since the data to be transmitted to the information terminal 40 is the spectrum data obtained by FFT processing the temporal waveform signal detected at the vibration sensor 21, a data amount to be transmitted is remarkably reduced, as compared to a case where the temporal waveform is transmitted to the information terminal 40. For this reason, the data transfer time is shortened, so that the communication time is reduced.

The bearing diagnosis unit of the calculation processing unit 43 analyzes the spectrum data received at the transmitting and receiving unit 42 of the information terminal 40 to diagnose whether the rolling bearing 11 is abnormal by referring to the bearing information recorded in the internal memory 44 (step S7).

Specifically, the bearing damaging frequency resulting from the damage of each part of the rolling bearing 11 is calculated in advance by using the converted bearing damaging frequency corresponding to the rolling bearing and the actual rotating speed of the rolling bearing 11. Then, the spectrum data received from the analyzer 20 is compared with each bearing damaging frequency (it is satisfied whether the peak frequency corresponds to the bearing damaging frequency), so that it is checked whether the abnormality such as damage of the rolling bearing 11 has occurred and the damaged part is specified.

That is, the bearing damaging frequency component of the rolling bearing 11 includes the bearing damaging component, i.e., the inner ring damaging component Si, the outer ring damaging component So, the rolling element damaging component Sb and the cage component Sc, and each level of the frequency components is extracted. Then, it is specified which of the outer ring 12, the inner ring 13, the rolling element 14 and the cage is the abnormal part. Then, a result thereof is output and displayed to the display operation unit 45 (step S8).

<Vibration Value Measurement/Simple Diagnosis>

Figure 4:
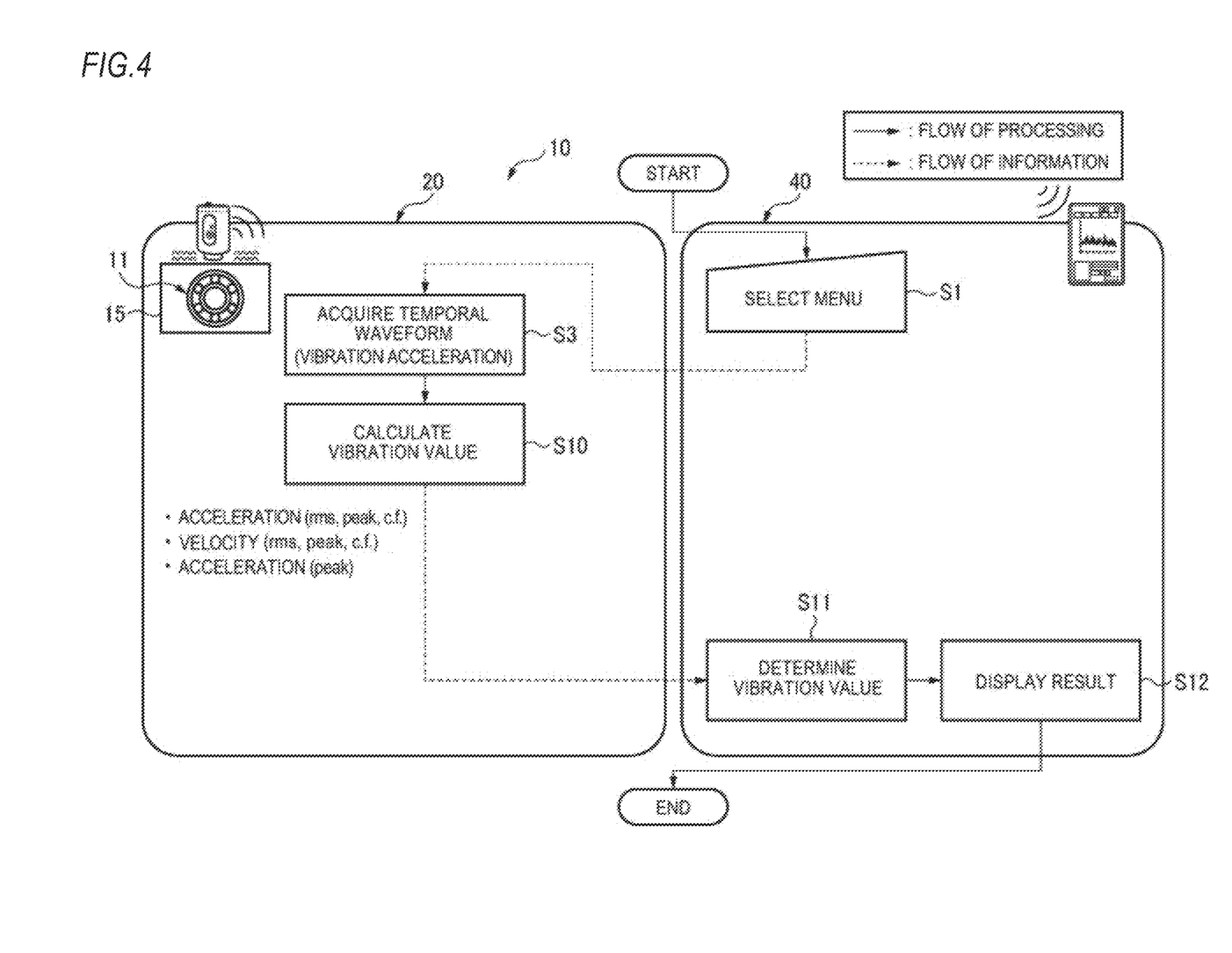
FIG. 4 is a flowchart depicting a sequence of vibration value measurement and simple diagnosis that are to be performed by the machine component diagnosis system shown in FIG. 1.

In step S1, when the vibration value measurement/simple diagnosis by the machine component diagnosis system 10 is selected, an operation command to perform the vibration value measurement/simple diagnosis is transmitted to the analyzer 20 via the transmitting and receiving unit 42 and the transmitting and receiving unit 26, so that the vibration sensor 21 acquires the temporal waveform of the vibration of the rolling bearing 11 (step S3), as shown in FIG. 4.

Then, the calculation processing unit 23 calculates a vibration value, which is a diagnosis parameter to be used for diagnosis in the simple diagnosis function (step S10). As the diagnosis parameter, at least one vibration value of the effective value (rms), the peak value (peak) and the crest factor (c.f.) of the acceleration and velocity of the vibration and the peak value (peak) of displacement is extracted as a simple diagnosis value.

Thereafter, the calculated vibration value is transmitted to the information terminal 40 via the transmitting and receiving units 26, 42.

Then, from the calculated diagnosis parameters of the acceleration, velocity and displacement, it is possible to determine an absolute value on the basis of the ISO standard (for example, ISO 10816-1 and the like) by the simple diagnosis function. Also, it is possible to determine any threshold. That is, the effective value (rms), the peak value (peak) and the crest factor (c.f.) of the acceleration and velocity and the peak value (peak) of displacement, which are the calculated diagnosis parameters, are compared with the respective thresholds for simple diagnosis (step S11). In the case of "effective value (rms), peak value (peak) and crest factor (c.f.)>each threshold", it is determined that the rolling bearing 11 is abnormal. When each value is equal to or smaller than the threshold, it is determined that there is no abnormality. To this end, each threshold is preserved in the internal memory 44.

A diagnosis result of the simple diagnosis is displayed by the display operation unit 45 (step S12).

In the meantime, the simple diagnosis in step S11 may be performed by the analyzer 20. Also, the result display in step S12 may be performed by the analyzer 20. When the result display is performed by the analyzer 20, light such as LED light, sound such as alarm and the other general warning method may be adopted.

<Frequency Analysis>

Figure 5:
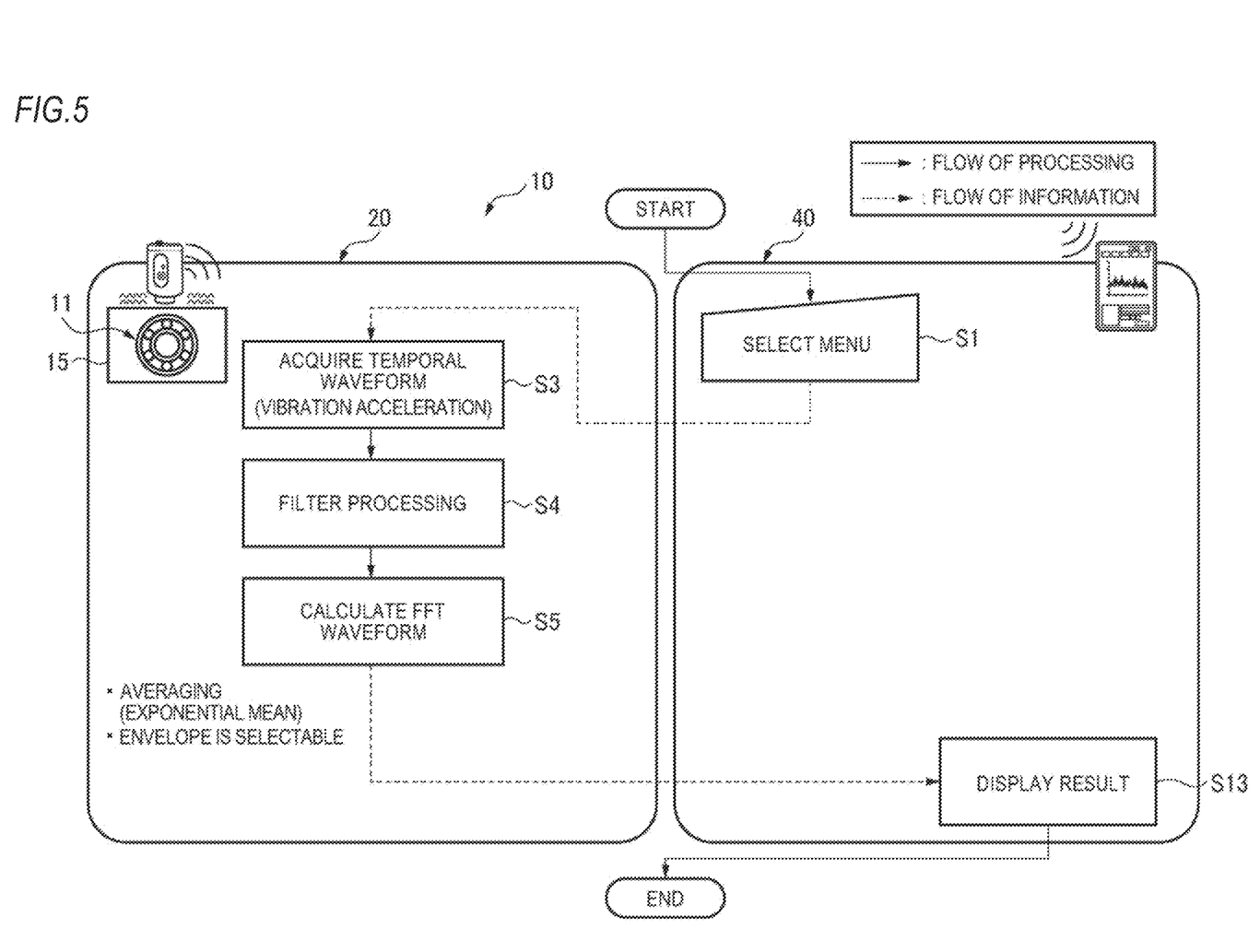
FIG. 5 is a flowchart depicting a sequence of frequency analysis that is to be performed by the machine component diagnosis system shown in FIG. 1.

In step S1, when the frequency analysis by the machine component diagnosis system 10 is selected, an operation command to perform the frequency analysis is transmitted to the analyzer 20 via the transmitting and receiving unit 42 and the transmitting and receiving unit 26, as shown in FIG. 5. The analyzer 20 operates on the basis of the command signal received from the information terminal 40, so that the vibration sensor 21 acquires the temporal waveform of the vibration of the rolling bearing 11 (step S3).

The acquired temporal waveform of the vibration is filter-processed by the HP filter 27, the AA filter 29 and the filter processing function of the calculation processing unit 23 (step S4), so that a predetermined frequency band is extracted, like the case of the bearing diagnosis.

Then, the calculation processing unit 23 performs the frequency analysis for the vibration signal in the extracted predetermined frequency band (step S5). The calculation processing unit 23 is an FFT calculation unit configured to calculate the frequency spectrum of the vibration signal, and calculates the FFT waveform on the basis of the FFT algorithm. In the meantime, the FFT waveform is subjected to the averaging processing by using the exponential mean, and may be selectively subjected to the envelope processing.

The calculated FFT waveform is transmitted from the transmitting and receiving unit 26 of the analyzer 20 to the transmitting and receiving unit 42 of the information terminal 40, so that the result is displayed on the display operation unit 45 of the information terminal 40 (step S13).

As described above, the information terminal 10 of the first embodiment includes the database (the internal memory 44) in which the damaging frequency resulting from the damage of the rolling bearing 11 is preserved as the converted damaging frequency obtained by converting the damaging frequency on the basis of the predetermined rotating speed of the rolling bearing 11, and the damaging frequency is provided by calculating the converted damaging frequency in the database by using the actual rotating speed of the rolling bearing 11. Thereby, it is possible to acquire the damaging frequency without preserving the specifications of each rolling bearing 11 in the information terminal 40, so that it is possible to keep the specifications of the rolling bearing 11 confidential.

Particularly, in the first embodiment, the converted damaging frequency preserved in the database is calculated for each of the rolling bearings 11 of the plurality of bearing numbers, based on the specifications of the rolling bearing 11 of the bearing number and the predetermined rotating speed of the rolling bearing 11, with the predetermined relation equation for providing the damaging frequency, and the damaging frequency is provided by calculating the converted damaging frequency corresponding to the bearing number in the database by using the actual rotating speed of the rolling bearing.

Also, in the first embodiment, the display operation unit 45 for inputting or selecting the bearing number of the roller bearing 11 is further provided. When the converted damaging frequency corresponding to the input or selected bearing number is included in the database, the damaging frequency is provided by calculating the converted damaging frequency corresponding to the bearing number in the database and predetermined as corresponding to an actual rotating speed, which is not necessarily detected during implementation of various embodiments described herein, of the rolling bearing 11, and when the converted damaging frequency corresponding to the input or selected bearing number is not included in the database, the damaging frequency is calculated on the basis of the specifications of the rolling bearing 11 directly input from the display operation unit and the actual rotating speed of the rolling bearing 11 or on the basis of the converted damaging frequency directly input from the display operation unit 45 and the actual rotating speed of the rolling bearing 11, with the predetermined relation equation for providing the damaging frequency. Accordingly, it is possible to calculate the damaging frequency even for the rolling bearing 11 of the bearing number of which the converted damaging frequency is not preserved in the database of the information terminal 40, so that it is possible to diagnose the abnormality of the rolling bearing 11.

Also, the machine component diagnosis system 10 of the first embodiment includes the information terminal 40 and the vibration diagnosis unit 20 capable of transmitting and receiving the signal to and from the information terminal 40, the vibration diagnosis unit 20 includes the vibration sensor 21 configured to detect the vibration of the machine component, the filter processing unit 22 configured to extract the predetermined frequency band from the waveform of the signal detected by the vibration sensor 21, and the calculation processing unit 23 configured to analyze frequency of the waveform after filter processing obtained by the filter processing unit 22 and to obtain the spectrum data, and the information terminal 40 includes the calculation processing unit (the bearing diagnosis unit) 43 configured to compare the frequency component, which is included in the spectrum data transmitted from the vibration analyzer 20, and the damaging frequency resulting from the damage of the rolling bearing 11, and to diagnose the abnormality of the rolling bearing 11, and the display unit configured to output the diagnosis result diagnosed by the calculation processing unit 43. Accordingly, it is possible to reduce the data amount to be transmitted from the vibration analyzer 20 to the information terminal 40, thereby diagnosing the machine component at high speed.

Second Embodiment

Figure 6:
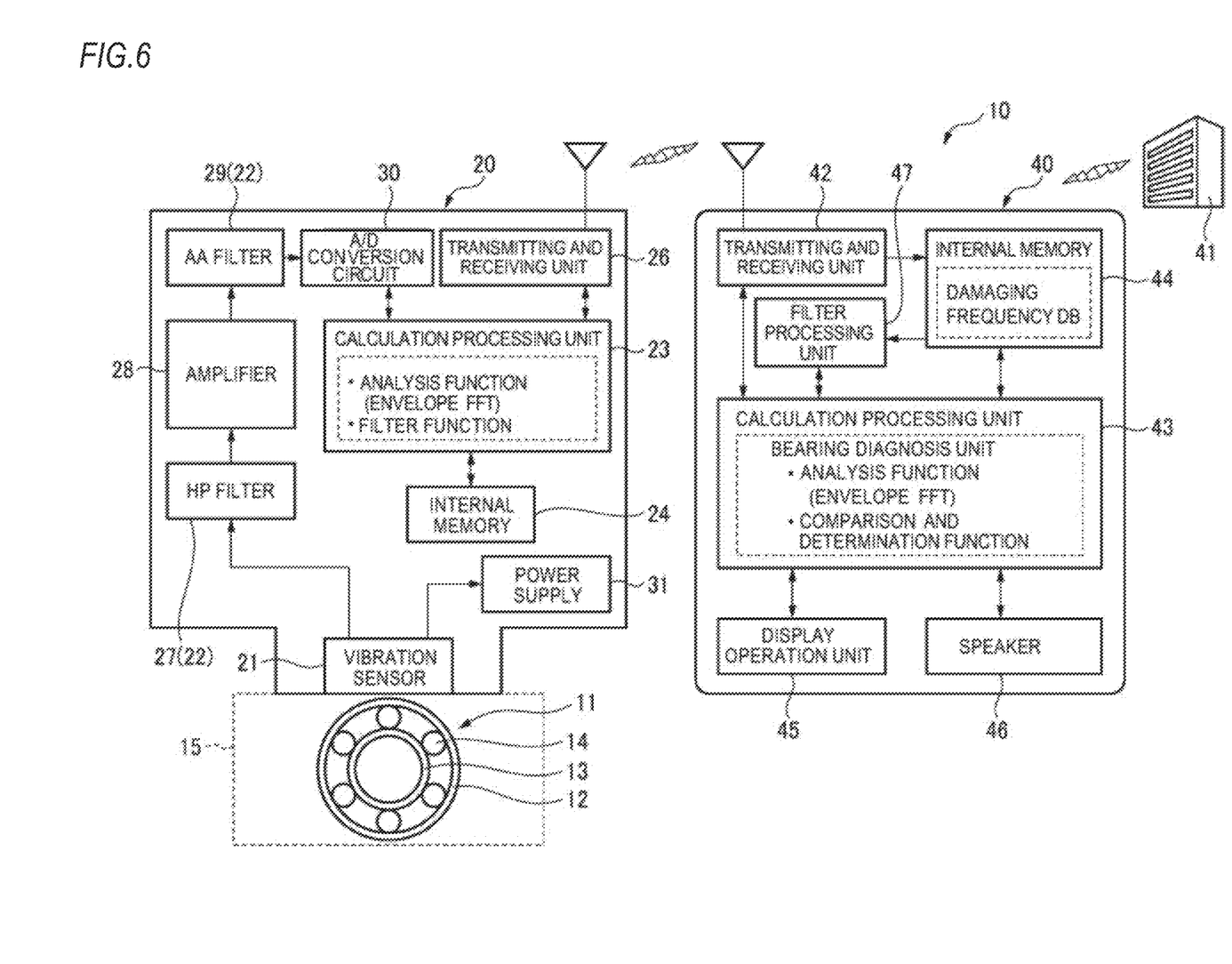
FIG. 6 is a block diagram depicting a configuration of a machine component diagnosis system in accordance with a second embodiment of the present invention.

FIG. 6 is a block diagram depicting a configuration of a machine component diagnosis system in accordance with a second embodiment of the present invention. As shown in FIG. 6, the machine component diagnosis system 10 includes the wireless type vibration analyzer 20 and the information terminal 40, and has a sound detection function of reproducing driving sound of the rolling bearing 11 by the speaker 46, in addition to the diagnosis function of the rolling bearing 11 described in the first embodiment. For this reason, in the second embodiment, the sound detection function is added to the diagnosis menu.

When detecting the driving sound, the temporal waveform of the vibration of the rolling bearing 11 acquired by the vibration sensor 21 is used. Therefore, the temporal waveform of the vibration is transmitted from the analyzer 20 to the information terminal 40. To this end, the machine component diagnosis system 10 of the second embodiment includes a filter processing unit 47 at the information terminal 40, and the filter processing unit 47 is configured to extract a specific frequency band from the temporal waveform of the vibration of the rolling bearing 11 and to transmit the same to the calculation processing unit 43. Also, the calculation processing unit 43 of the information terminal 40 has a function of performing the envelope processing or FFT analysis for the temporal waveform of the specific frequency band.

<Sound Detection>

Figure 7:
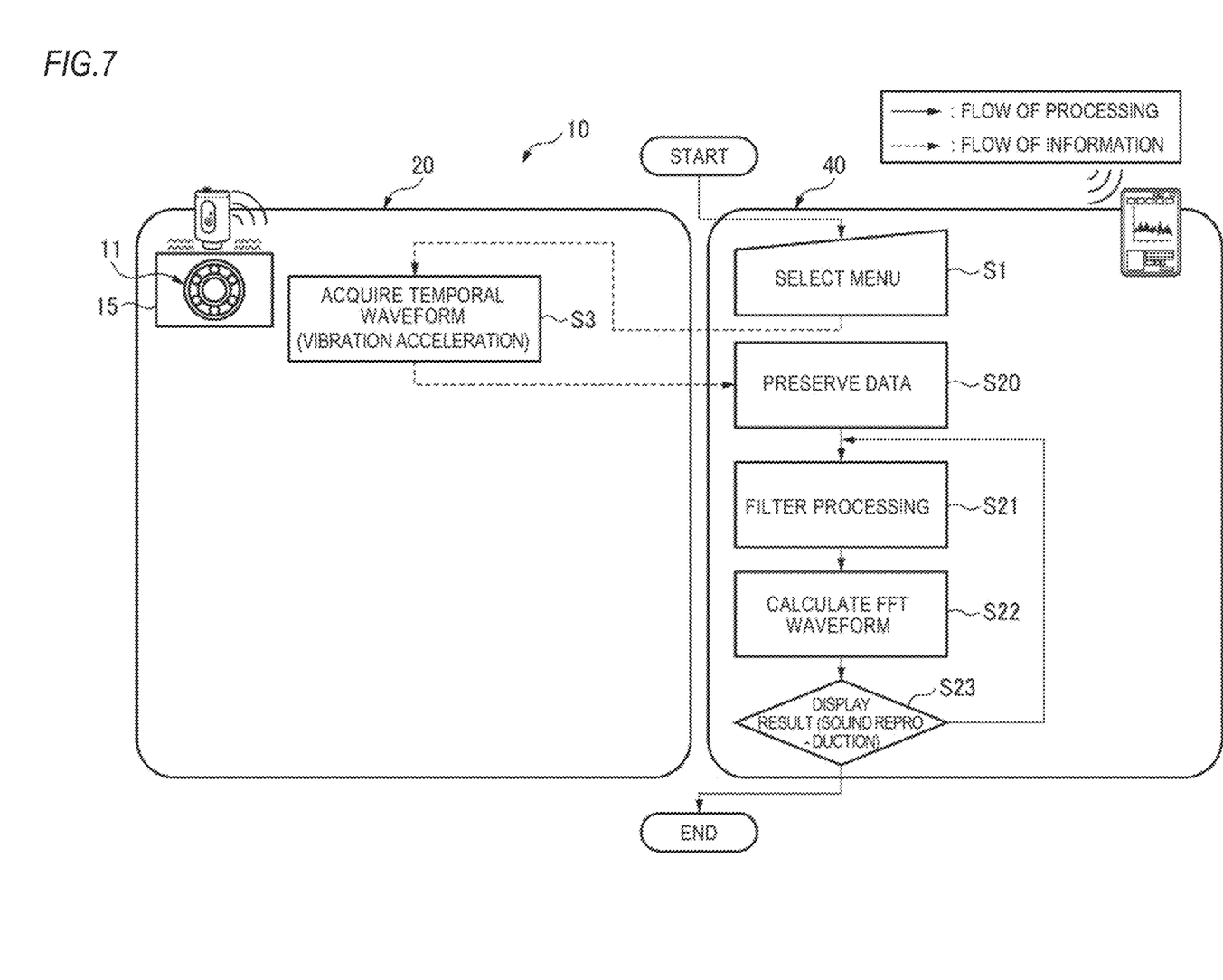
FIG. 7 is a flowchart depicting a sequence of sound detection that is to be performed by the machine component diagnosis system shown in FIG. 6.

In the second embodiment, in step S1, when the sound detection function of the machine component diagnosis system 10 is selected, an operation command to perform the sound detection is transmitted to the analyzer 20 via the transmitting and receiving unit 42 and the transmitting and receiving unit 26, as shown in FIG. 7. The analyzer 20 operates on the basis of the command signal received from the information terminal 40, so that the vibration sensor 21 acquires the temporal waveform of the vibration of the rolling bearing 11 (step S3).

The acquired temporal waveform of the vibration is transmitted to the information terminal 40 via the transmitting and receiving unit 26 and the transmitting and receiving unit 42. The received temporal waveform of the vibration is preserved as data in the internal memory 44 so that the temporal waveform data can be repetitively used (step S20).

Then, the filter processing unit 47 performs the filter processing of extracting the specific frequency band in which the sound detection is intended (step S21), and the calculation processing unit 43 calculates the FFT waveform of the vibration signal on the basis of the FFT algorithm (step S22). The driving sound corresponding to the calculated FFT waveform is output to the speaker 46 and is then reproduced (step S23). Also, when it is intended to listen the driving sound of the other frequency band, the processing returns to step S21, and the temporal waveform of the vibration preserved in the internal memory 44 is again acquired and the same operations are performed.

Like this, according to the machine component diagnosis system 10 of the second embodiment, it is possible to add the sound detection function. In particular, the information terminal 40 is provided with the filter processing unit 47 and the calculation processing unit 43 is configured to perform the FFT analysis, so that it is possible to reproduce and display the driving sound in the plurality of frequency bands.

The other configurations and operations are the same as the machine component diagnosis system 10 of the first embodiment.

In the meantime, the present invention is not limited to the embodiments, and can be appropriately modified and improved.

For example, the machine component, which is a diagnosis target, is not limited to the rolling bearing 11, and the present invention can be applied to a machine component that is to be vibrated due to the driving thereof, for example, a machine component such as a gear.

Also, in the machine component diagnosis system 10 of the embodiments, the analyzer 20 and the information terminal 40 are associated one to one, so that the data is transmitted and received at the specific analyzer 20 and the specific information terminal 40. However, regarding the diverse diagnoses to be performed by the machine component diagnosis system 10, a plurality of analyzers 20 may be associated with one information terminal 40 and a plurality of machine components may be monitored by patrol inspection.

In the case of the patrol monitoring, the analyzers 20 may be respectively provided to each of the machine components, and the portable information terminal 40 such as a tablet may be configured to monitor and diagnose the plurality of machine components. Also, when the information terminal 40 approaches to the analyzer 20 for patrol monitoring, i.e., when performing the machine component, the power supply of the analyzer 20 may be automatically turned on so that the detection/analysis/transmission are to be automatically performed in accordance with instructions from the information terminal 40.

Also, the USB terminal provided to the wireless type vibration analyzer 20 may be configured to transmit the temporal waveform and the spectrum data to the information terminal 40 in a wired manner, in addition to the function of charging the power supply 31 from the outside, as described above.

Also, when the diverse data that is to be preserved in the information terminal 40 is received at the other devices such as a host computer, the more detailed management such as management of patrol route, management of time trend of the vibration level and preparation of a simple report becomes possible.

Also, the database of the converted damaging frequency preserved in the internal memory 44 of the information terminal 40 of the embodiments is effective to keep the specification sizes of the machine component (the rolling bearing 11) confidential, and is not limited to the case where the abnormality is diagnosed using the wireless type vibration analyzer 20 of the present invention.

Also, in the embodiments, the database of the converted damaging frequency is preserved in the internal memory 44, and the damaging frequency is calculated using the actual rotating speed of the machine component on the basis of the converted damaging frequency. However, the calculation of the damaging frequency is not limited thereto.

That is, the predetermined relation equation for providing the damaging frequency as shown in FIG. 3 may be preserved in the database of the information terminal 40, and the damaging frequency may be calculated on the basis of the specifications of the machine component directly input by the display operation unit and the actual rotating speed of the machine component.

Alternatively, the converted damaging frequency may be manually calculated in advance from an outside, and the damaging frequency may be calculated on the basis of the converted damaging frequency directly input from the display operation unit and the actual rotating speed of the machine component.

Therefore, when calculating the damaging frequency to diagnose the abnormality by any one of the above methods, the converted damaging frequency may not be preserved in advance in the database of the information terminal 40.

That is, the present invention includes the information terminal configured to extract the predetermined frequency band from the waveform of the signal of the machine component detected by the vibration sensor, to compare the analyzed frequency component and the damaging frequency resulting from the damage of the machine component, and to diagnose abnormality of the machine component, wherein the damaging frequency resulting from the damage of the machine component is calculated on the basis of the specifications of the machine component directly input from the display operation unit and the actual rotating speed of the machine component or on the basis of the converted damaging frequency directly input from the display operation unit and the actual rotating speed of the machine component, with the predetermined relation equation for providing the damaging frequency.

Also, the vibration analyzer of the present invention is not limited to the wireless type of the embodiments, and may be a wired type.

Also, in the embodiments, the filter processing unit 22 is configured by the HP filter 27, the AA filter 29 and the filter processing function of the calculation processing unit 23. However, the filter processing unit 22 of the present invention is not limited to the embodiments inasmuch as it is configured to extract the predetermined frequency band, which is to be analyzed frequency, from the waveform of the signal detected by the vibration sensor, and may be configured only by an analog filter or a digital filter.

Also, the vibration analyzer of the present invention may be an analyzer having other sensor mounted therein. In this case, for example, a temperature gauge may be mounted.

Also, for example, the other sensor may be provided at an outside, and a terminal configured to receive a signal thereof may be provided.

Also, the vibration analyzer of the present invention may be mounted at an appropriate position. For example, the vibration analyzer may be arranged in a vertical direction (radial direction) to the rotary shaft or may be arranged in a parallel direction (thrust direction).

The subject application is based on Japanese Patent Application No. 2017-59297 filed on Mar. 24, 2017, the contents of which are incorporated herein by reference.

DESCRIPTION OF REFERENCE NUMERALS

10: machine component diagnosis system
11: rolling bearing (machine component)
12: outer ring
13: inner ring
14: rolling element
20: wireless type vibration analyzer
21: vibration sensor
22: filter processing unit
23: calculation processing unit
24: internal memory
26: transmitting and receiving unit
40: information terminal
42: transmitting and receiving unit
43: calculation processing unit
44: internal memory (database)
45: display operation unit (display unit)
47: filter processing unit
Sb: rolling element damaging component (damaging frequency)
Sc: cage component (damaging frequency)
Si: inner ring damaging component (damaging frequency)
So: outer ring damaging component (damaging frequency)

The invention claimed is:

1. An information terminal, comprising:
at least one hardware processor configured to implement control of:
extracting a specific frequency band from a waveform of a signal of a machine component detected by a vibration sensor,
transforming, in response to extracting the specific frequency band from the waveform, the extracted specific frequency band from a time domain to a frequency domain,
comparing an analyzed frequency component, from the transformed, extracted frequency band, to a value corresponding to a predetermined frequency component that is predetermined to be generated by the machine component in a damaged state, and
diagnosing an abnormality of the machine component as a result of comparing the analyzed frequency component to the value; and
a database comprising the value.

2. The information terminal according to claim 1, wherein the database comprises a plurality of other values, and
wherein the other values respectively correspond to other predetermined frequency components that are predetermined to be generated by other machine components in other damaged states.

3. The information terminal according to claim 2, further comprising:
a display, and
wherein the at least one hardware processor is further configured to control the display to receive a user input to the display,
wherein the user input indicates at least one of the other machine components,
wherein, the at least one hardware processor is further configured to, in response to the user input being input to the display, implement:
searching the database for a second value according to the at least one of the other machine components,
in response to the second value being found in the database, selecting the second value, and
in response to the second value being absent from the database, receiving specifications of the at least one of the other machine components input to the display and calculating the second value based on the specifications.

4. The information terminal according to claim 1,
wherein the machine component is a bearing,
wherein the predetermined frequency component that is predetermined to be generated by at least one of an inner ring, an outer ring, a rolling element and a cage of the bearing.

5. A machine component diagnosis system comprising:
an information terminal; and
a vibration analyzer configured to transmit a signal to the information terminal and configured to receive the signal from the information terminal,
wherein the vibration analyzer is configured to:
detect a vibration of a machine component;
extract a predetermined frequency band from a waveform of the vibration; and
obtain spectrum data from the extracted predetermined frequency band by transforming, in response to extracting the predetermined frequency band from the waveform, the extracted predetermined frequency band from a time domain to a frequency domain, and
wherein the information terminal is configured to:
compare an analyzed frequency component, from the spectrum data, to a value corresponding to a predetermined frequency component that is predetermined to be generated by the machine component in a damaged state, and
diagnose an abnormality of the machine component as a result of comparing the analyzed frequency component to the value;
wherein the information terminal comprises:
a database comprising the value; and
a display, and
wherein the information terminal is configured to control the display to output a diagnosis result based on the result of comparing the analyzed frequency component to the value.

6. The information terminal according to claim 1,
wherein the predetermined frequency component is provided by calculating the value in the database using an actual rotating speed of the machine component.

7. The machine component diagnosis system according to claim 5,
wherein the predetermined frequency component is provided by calculating the value in the database using an actual rotating speed of the machine component.

8. The machine according to claim 5,
wherein the information terminal and the vibration analyzer are separate from each and are configured to communicate to each other over a network.

9. The machine component diagnosis system according to claim 5,
  wherein the machine component diagnosis system has a sound detection function of reproducing driving sound of the machine component by a speaker, and
  wherein the information terminal is configured to extract the specific frequency band from the spectrum data transmitted from the vibration analyzer and to perform envelope processing or FFT analysis for the specific frequency band prior to being outputted to the speaker.

* * * * *